United States Patent
Zhao et al.

(10) Patent No.: US 8,874,069 B1
(45) Date of Patent: Oct. 28, 2014

(54) DYNAMICALLY TOGGLING DATA DEDICATED TRANSMISSION MODE IN A WIRELESS COMMUNICATION DEVICE

(71) Applicant: Sprint Spectrum L.P., Overland Park, KS (US)

(72) Inventors: Young Zhao, Overland Park, KS (US); Jasinder P. Singh, Olathe, KS (US)

(73) Assignee: Sprint Spectrum L.P., Overland Park, KY (US)

(*) Notice: Subject to any disclaimer, the term of this patent is extended or adjusted under 35 U.S.C. 154(b) by 15 days.

(21) Appl. No.: 13/680,665

(22) Filed: Nov. 19, 2012

(51) Int. Cl.
*H04M 11/04* (2006.01)
*H04W 76/04* (2009.01)
*H04W 4/16* (2009.01)
*H04W 4/12* (2009.01)

(52) U.S. Cl.
CPC ............... *H04W 76/04* (2013.01); *H04W 4/16* (2013.01); *H04W 4/12* (2013.01)
USPC ...................... 455/404.1; 455/414.1; 455/417

(58) Field of Classification Search
None
See application file for complete search history.

(56) References Cited

U.S. PATENT DOCUMENTS

| 8,335,499 B1* | 12/2012 | Zhao et al. | 455/418 |
| 2003/0157923 A1* | 8/2003 | Tani | 455/404 |
| 2009/0280770 A1* | 11/2009 | Mahendran | 455/404.1 |
| 2012/0014345 A1* | 1/2012 | Faurie et al. | 370/329 |

* cited by examiner

*Primary Examiner* — Suhail Khan

(57) ABSTRACT

A wireless communication device (WCD) may be configured to engage in a wireless data communication session of a given type. The WCD may determine the given type of wireless data communication session, and based on the given type, the WCD may set itself to operate in a current operational state selected from a group consisting of a first and second operational state. While engaged in the wireless data communication session, the WCD may wirelessly receive a voice call setup request from a radio access network (RAN) seeking to set up a voice call to the WCD over an air-interface protocol. In accordance with the current operational state, the WCD may make a decision of whether to accept or reject the voice call request so as to interrupt or not interrupt the wireless data communication session.

19 Claims, 6 Drawing Sheets

US 8,874,069 B1

DYNAMICALLY TOGGLING DATA DEDICATED TRANSMISSION MODE IN A WIRELESS COMMUNICATION DEVICE

BACKGROUND

To provide cellular wireless communication service, a wireless service provider or "wireless carrier" typically operates a radio access network (RAN) that defines one or more coverage areas in which wireless communication devices (WCDs) can be served by the RAN and can thereby obtain connectivity to broader networks such as the public switched telephone network (PSTN) and the Internet. A typical RAN may include one or more base transceiver stations (BTSs) (e.g., macro network cell towers and/or femtocells), each of which may radiate to define a cell and cell sectors in which WCDs can operate. Further, the RAN may include one or more base station controllers (BSCs), which may be integrated with or otherwise in communication with the BTSs. The BSCs may include or be in communication with a switch or gateway that provides connectivity with one or more transport networks. With this or other arrangements, a cell phone, personal digital assistant, wirelessly equipped computer, or any other WCD that is positioned within coverage of the RAN can then communicate with a BTS and in turn, via the BTS, with other served devices or with other entities on the transport network.

OVERVIEW

A WCD may be engaged in a data communication session and may receive data while operating according to a network protocol, such as Long-Term Evolution (LTE), Evolution Data Optimized (EV-DO), and the like. While engaged in the data communication session, the WCD may receive from the RAN a page message representative of a request to establish a circuit-switched voice call over a Code Division Multiple Access (CDMA) network protocol or other protocol, and interrupt the current data communication session in order to establish the voice call. Alternatively, the WCD may set itself (possibly before, during, or after establishing the data communication session) to operate in a mode in which it cannot receive a voice call, such as a 1x-data call (e.g., a 1xRTT call), in order to prevent an interruption of the data communication session. The mode in which the WCD operates in order to reject incoming voice calls may be referred to herein as Data Dedicated Transmission Mode (DDTM) "ON," and a mode in which the WCD accepts incoming voice calls and allows the data communication session to be interrupted, may be referred to herein as DDTM "OFF." In some scenarios, an interruption of the data communication session may be desirable, often depending on the type of data communication session. In other scenarios, however, interruption of the data communication session might not be desirable.

As such, presently disclosed are systems and methods for dynamically toggling DDTM in a WCD. One embodiment takes the form of a method carried out by a WCD. The method includes a WCD engaging in a wireless data communication session of a given type and determining the given type of the wireless data communication session. The method further includes the WCD, while engaged in the wireless data communication session, wirelessly receiving a voice call setup request seeking to set up a voice call to the WCD and, based on the determined given type of the wireless data communication session, the WCD making a decision of whether to accept the voice call setup request.

Still further, the method includes if the decision made by the WCD is to accept the voice call setup request, the WCD accepting setup of the voice call and the WCD interrupting the wireless data communication session to engage in the voice call, and the method also includes if the decision made by the WCD is to not accept the voice call setup request, the WCD not accepting setup of the voice call and not interrupting the wireless data communication session to engage in the voice call.

Another embodiment takes the form of a non-transitory computer-readable medium having stored thereon program instructions executable by a WCD to cause the WCD to perform functions comprising the method.

Yet another embodiment takes the form of a WCD that includes at least one wireless-communication interface, at least one processor, data storage, and program instructions stored in the data storage executable by the at least one processor for performing functions when the WCD engages in a wireless data communication session of a given type. The functions include determining the given type of the wireless data communication session. Further, the functions include, if the determined given type is a first type and not a second type, the WCD setting itself to operate in a first operational state in which the WCD will accept incoming voice call requests while the WCD is engaged in the data communication session. Still further, the functions include if the determined given type is the second type and not the first type, the WCD setting itself to operate in a second operational state in which the WCD will not accept incoming voice call requests while the WCD is engaged in the data communication session.

This overview is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

I. Introduction

The present systems and methods will now be described with reference to the figures. It should be understood, however, that numerous variations from the depicted arrangements and functions are possible while remaining within the scope and spirit of the claims. For instance, one or more elements may be added, removed, combined, distributed, substituted, re-positioned, re-ordered, and/or otherwise changed. Further, where this description refers to one or more functions being implemented on and/or by one or more devices, one or more machines, and/or one or more networks, it should be understood that one or more of such entities could carry out one or more of such functions by themselves or in cooperation, and may do so by application of any suitable combination of hardware, firmware, and/or software. For instance, one or more processors may execute one or more sets of programming instructions as at least part of carrying out one or more of the functions described herein.

II. Example Communication Networks

Figure 1:
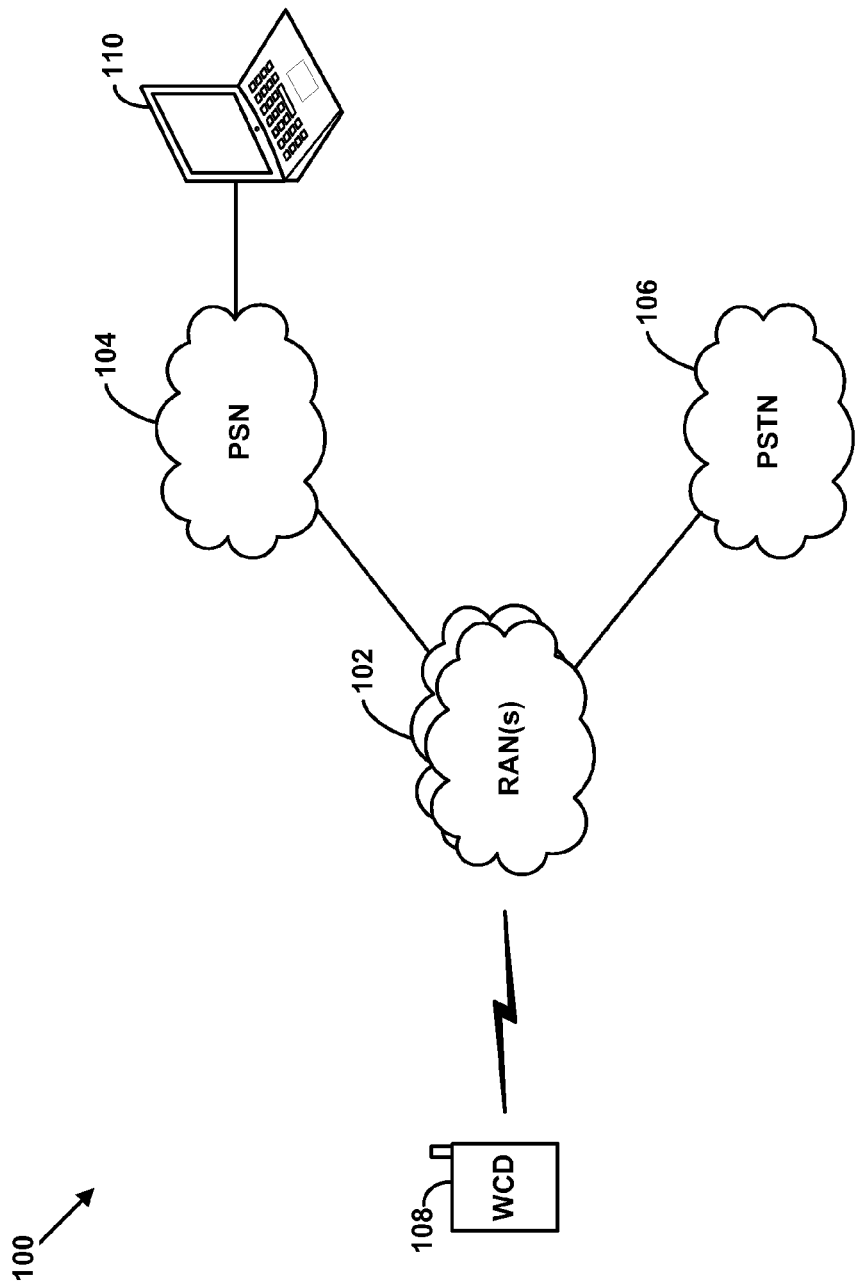
FIG. 1 is a simplified block diagram of an example communication system, in which an example method can be implemented.

FIG. 1 depicts a communication system 100 that includes at least one RAN 102, a packet-switched network (PSN) 104, and a PSTN 106. The at least one RAN 102 communicates with the PSN 104 via a communication link and with PSTN 106 via another communication link. Either or both of these links may include one or more wired and/or wireless interfaces.

The communication system 100 may include a WCD 108 that communicates with the at least one RAN 102 over an air-interface. Further, the communication system 100 may include a computing device 110 that communicates with the PSN 104. In some examples, the WCD 108 may be configured to engage in a data communication session with the computing device 110 through the PSN 104. The data communication session may be a "real-time" data communication session, such as a Voice over Internet Protocol (VoIP) call in accordance with an LTE protocol, or a data communication session used for a push-to-talk (PTT) function in accordance with an EV-DO protocol. Alternatively, the data communication session may be a "non-real-time" wireless data communication session, such as a web browsing session. The WCD 108 may be configured to engage in other data communication sessions through the PSN 104 as well, both real-time data sessions and non-real-time data sessions. It should be understood, however, that while particular real-time and non-real-time sessions are described herein, other types of data communication sessions are also possible.

While engaged in the data communication session with the computing device 110, the WCD 108 may receive from the RAN a page message representative of an incoming voice call (also referred to as a "mobile terminated voice call") setup request. The WCD 108 may determine the type of data communication session (e.g., real-time, non-real-time, or another type of session) that it is engaged in and make a decision of whether to accept the incoming voice call setup request based at least in part on the determined type of data communication session. If the data session is a non-real-time data session, for example, the WCD 108 may set itself to operate in a DDTM OFF state, in which the WCD 108 may accept incoming voice call setup requests. Further, when the WCD 108 is operating in the DDTM OFF state, the WCD 108 may accept the incoming voice call setup request by sending a page message response to the RAN so as to establish the voice call.

Still further, accepting the incoming voice call setup request may interrupt or terminate the non-real-time data session with the computing device 110. For example, when the incoming voice call setup request is accepted and the voice call is established, the non-real-time data session that the WCD 108 was engaged in prior to establishing the voice call may become inactive and/or inaccessible for the duration of the voice call. The non-real-time data session may then be resumed upon terminating the voice call.

If the data session is a real-time data session, however, the WCD 108 may set itself to operate in a DDTM ON state, in which the WCD 108 may not accept incoming voice call setup requests. For example, in rejecting an incoming voice call setup request, the WCD 108 may notify the RAN of its current DDTM state and/or that it has rejected the incoming voice call setup request. Further, by rejecting the incoming voice call setup request, the real-time data session will not be interrupted.

Figure 2:
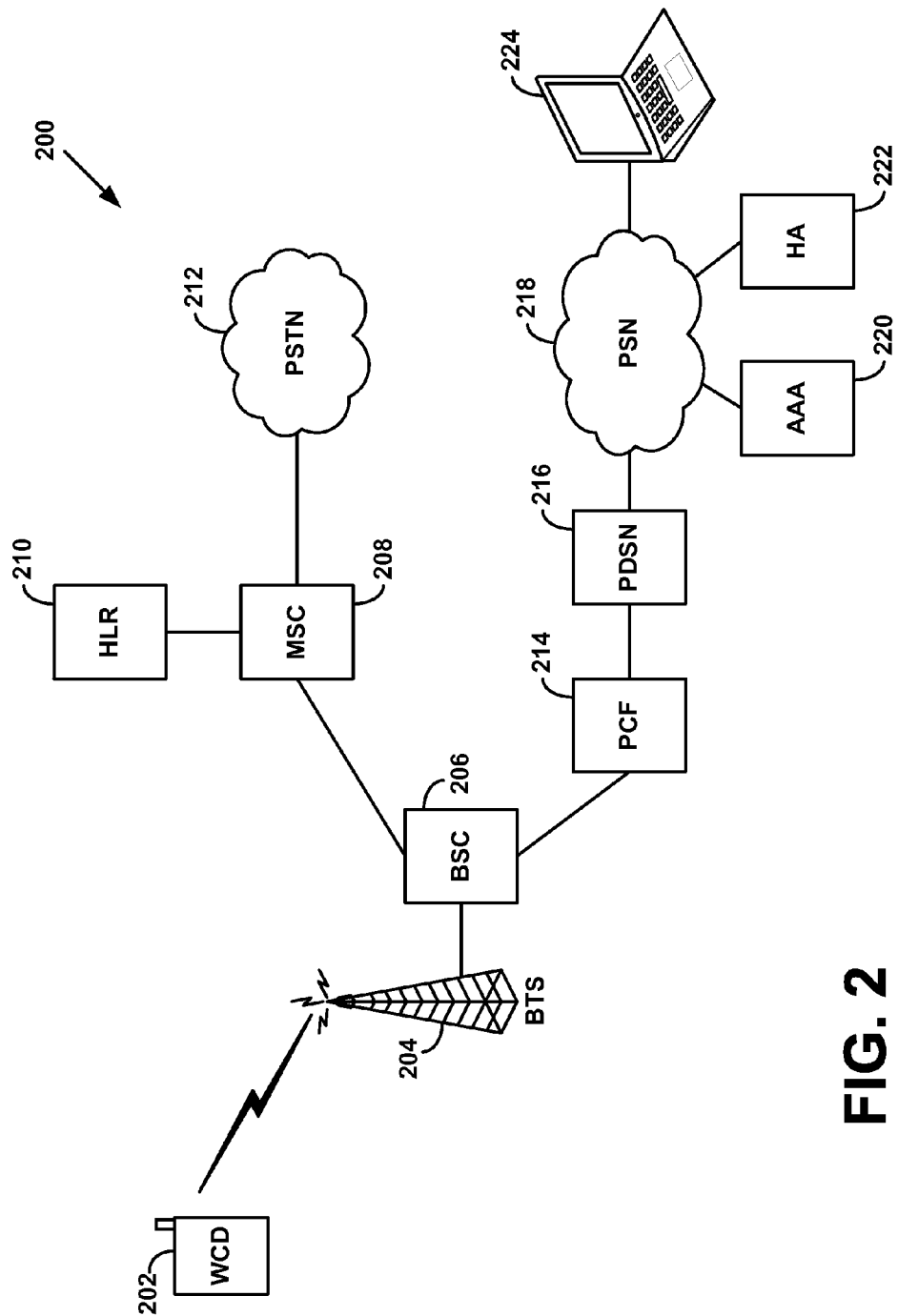
FIG. 2 is a block diagram of an example RAN, in which an example method can be implemented.

FIG. 2 depicts an example communication network 200, such as a RAN, which includes a CDMA network. As shown in FIG. 2, WCD 202 may communicate over a CDMA air-interface with a base transceiver station (BTS) 204, which is, in turn, coupled to or integrated with a base station controller (BSC) 206. Transmissions over air-interface from BTS 204 to WCD 202 may represent "forward link" communications with WCD 202. Conversely, transmissions over air-interface from WCD 202 to BTS 204 may represent "reverse link" communications from WCD 202.

BSC 206 may be connected to a mobile switching center (MSC) 208. BSC 206, MSC 208, or both, may act to control assignment of air-interface traffic channels to WCDs, and may provide access to wireless circuit-switched services such as circuit-voice and circuit-data services. As represented by its connection to PSTN 212, MSC 208 may also be coupled with one or more other MSCs or other telephony circuit switches, thereby supporting user mobility across MSC regions, as well as local and long-distance landline telephone services. A home location register (HLR) 210, which may be connected to MSC 208, may support mobility-related aspects of subscriber services, including dynamic tracking of subscriber registration location and verification of service privileges.

As shown, BSC 206 may also be connected with a packet-data serving node (PDSN) 216 by way of a packet control function (PCF) 214. PDSN 216, in turn, provides connectivity with PSN 218, such as the Internet and/or a wireless carrier's private core packet-network. Nodes on network 218 may include, by way of example, an authentication, authorization, and accounting (AAA) server 220, a mobile-IP home agent (HA) 222, and a remote computer 224. After acquiring a traffic channel over air-interface, WCD 202 may transmit a request to PDSN 216 for a connection to the packet data network. Then, following authentication of WCD 202 by AAA server 220, WCD 202 may be assigned an IP address by PDSN 216 or by HA 222, and may thereafter engage in packet-data communications with entities such as remote computer 224.

In some deployments, the combination of elements including BTS 204, BSC 206, and MSC 208 may be referred to as a RAN. However, a RAN may contain more or fewer elements. For instance, some RANs may also include HLR 210, PCF 214, PDSN 216, and/or other elements not shown in FIG. 2.

In a CDMA wireless network such as network 200, each wireless coverage area may employ one or more frequency bands, typically 1.25 MHz in bandwidth each, and each wireless coverage area may be distinguished from adjacent wireless coverage areas by a pseudo-random number offset ("PN offset"). Further, each wireless coverage area may concurrently communicate on multiple channels that are distinguished from one another by different CDMA codes (i.e., different Walsh codes). When a WCD 202 operates in a given wireless coverage area, communications between the WCD 202 and the BTS 204 of the wireless coverage area may be carried on a given frequency and may also be encoded (e.g., modulated) by the wireless coverage area's PN offset and a given Walsh code.

On the forward link, certain Walsh codes may be reserved for defining control channels, including a pilot channel, a sync channel, and one or more paging channels, and the remainder may be allocated dynamically for use as traffic channels, i.e., to carry bearer data such as email, web browsing, voice, video, and so on. Similarly, on reverse link communications, one or more offsets of a CDMA code (i.e., offsets of a PN long code) may be reserved for defining control channels, such as access channels, and the remaining offsets may be allocated dynamically to WCDs 202 for use as traffic channels.

Under CDMA, when a RAN 200 seeks to communicate with a WCD 202 (e.g., to establish an incoming voice call with or transmit incoming packet data to a WCD 202), the RAN 200 may first page the WCD 202 on a CDMA paging channel. The purpose of paging the WCD 202 may be to determine whether the WCD 202 is still within range of a preferred wireless coverage area, and if so, to notify the WCD 202 of the incoming communication. If the WCD 202 is successfully paged, the RAN 200 may assign one or more traffic channels to WCD 202. The WCD 202 may then engage in a voice call or data communication session with the RAN 200. When a WCD 202 is engaged in an active data communication session over CDMA, such as a wireless packet data session, the WCD 202 will continue to transmit data to and/or receive data from the CDMA network until the data session is terminated or becomes inactive.

When an idle WCD 202 is the recipient of a new incoming call (i.e., the WCD 202 is the callee), the RAN 200 may transmit a page request message to the WCD 202 on the paging channel of the primary wireless coverage area. In response to receiving the page request message (and if the WCD 202 has made a decision to accept the incoming call), the WCD 202 may transmit, to the RAN 200, a page response message via the primary wireless coverage area's access channel. The RAN 200 may respond by assigning a traffic channel to the WCD 202, and transmitting, via the paging channel, an indication of this assignment (e.g., a Walsh code of the assigned traffic channel) to the WCD 202 in a channel assignment message. Then, the WCD 202 may use the assigned traffic channel for receiving bearer traffic for the voice or data call over the CDMA air-interface.

Service under a 3G/CDMA air-interface protocol may be implemented in conjunction with the network arrangement shown in FIG. 2, and, in some networks, service providers may only provide service under one or more 3G standards, such as 1xRTT and EV-DO. In other networks, service providers may provide service under a 3G protocol, such as CDMA (e.g., IS-95, IS-2000, 1xRTT, 1xEV-DO, etc.), as well as under a 4G protocol, such as LTE and/or WiMax.

Figure 3:
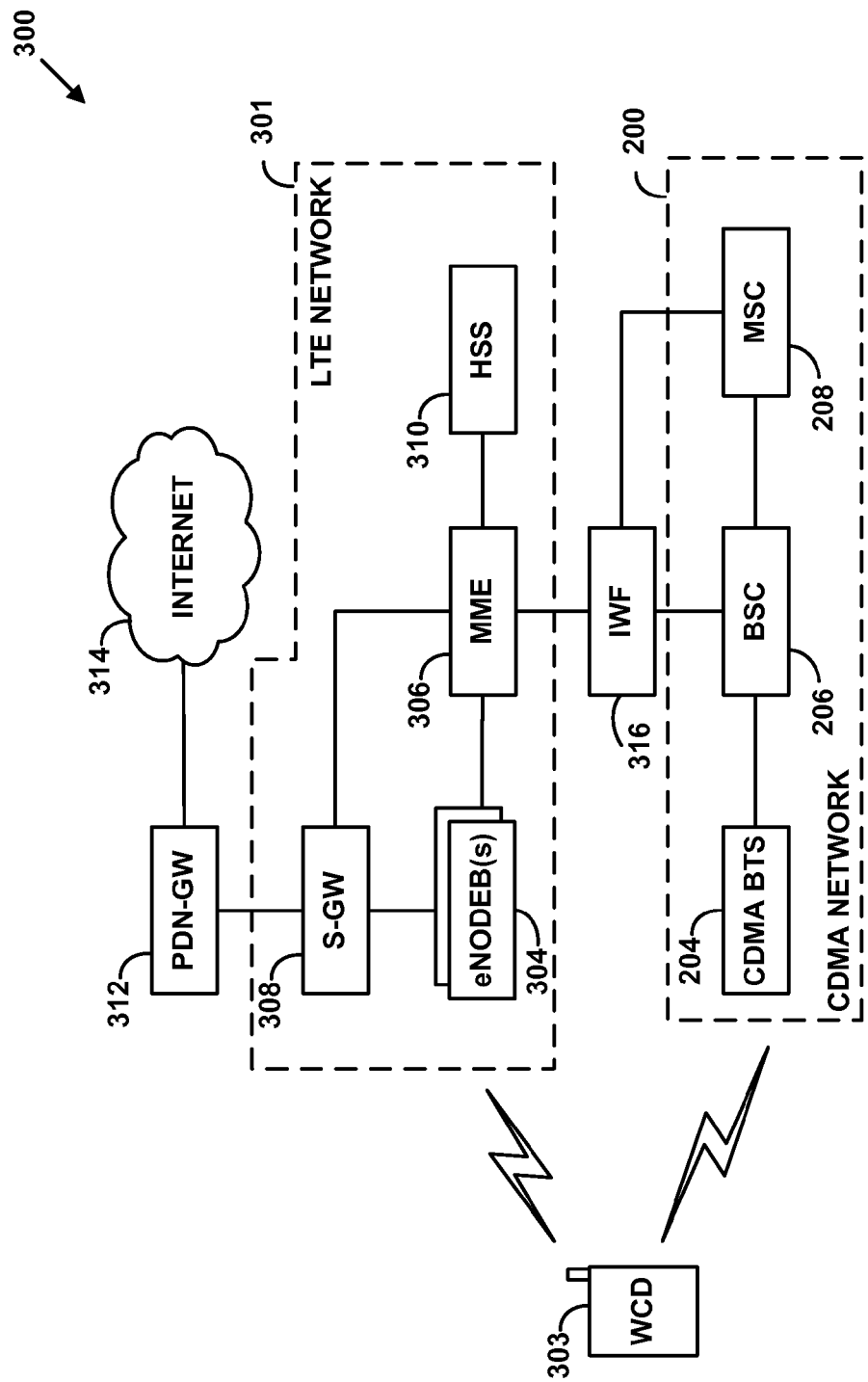
FIG. 3 is a block diagram of an example wireless communication network, in which an example method can be implemented.

FIG. 3 depicts an example wireless communication network 300 in which a service provider supports wireless service under two or more different air-interface protocols. In particular, FIG. 3 depicts an example RAN that includes an LTE network 301 to provide LTE service, and a CDMA network 200 to provide CDMA service. LTE may be characterized by high speed data transmission, while CDMA may be characterized by high quality circuit-switched voice calls, for example. As such, a WCD 303 operating in a network 300 may connect and communicate under different air-interface protocols, such as LTE and CDMA. In practice, network 300 may include two or more separate access networks with at least partially overlapping coverage areas (e.g., separate access network for LTE and CDMA). Alternatively, both LTE and CDMA communications may be supported in one access network.

LTE network 301 includes components to provide WCD 303 with service under LTE. In particular, LTE network 301 includes one or more eNodeBs (eNBs) 304, which may include base stations configured to support over-the-air communications with WCD 303 under LTE. Thus, eNB 304 may be an LTE equivalent of BTS 204 of the CDMA network 200. Each eNB 304 may provide service under LTE in one or more wireless coverage areas, such as a cell or one or more cell-sectors.

LTE network 301 also includes a mobility management entity (MME) 306, which may be configured to control communications between one or more eNBs 304 and a serving gateway (S-GW) 308. MME 306 may also be communicatively coupled to a home subscriber server (HSS) 310, which stores subscriber information, such as information related to WCD 303. More generally, MME 306 may support functionality such as mobility management, bearer management, paging-message distribution, security functions, authentication of WCDs, gateway selection for communications, and so on.

In an example configuration, S-GW 308 may be configured to communicate with eNB 304 and/or with MME 306 in order to provide various functions such as packet routing and forwarding, mobility anchoring, packet buffering, and so on. For instance, S-GW 308 may provide packet routing for LTE communications to and/or from WCD 303. Yet further, an LTE network 301 may include a packet data network gateway (PDN-GW) 312, which facilitates packet-data communications between S-GW 308 that operates according to LTE, and a packet-data network, such as Internet 314.

LTE network 301 may include an interworking function (IWF) 316, which may be a functional component of the network that supports interworking between different wireless technologies, such as LTE and CDMA. In an example configuration, IWF 316 may support communications between components of an LTE network 301 (e.g., MME 306) and components of a CDMA network 200 (e.g., BSC 206 and/or MSC 208).

When a serving eNB 304 or associated equipment receives a request to connect a call to the WCD 303 (e.g., an incoming call, such as a voice call, data session, or other type of call), the eNB 304 may transmit on a forward link control channel to the WCD 303 a page message representative of the request to setup the incoming call, and the WCD 303 may receive and respond to that page message on a reverse link access channel to facilitate setup of the call. When an incoming voice call is accepted, for example, the eNB 304 may then reserve resources for the call and transmit a directive for the WCD 303 to proceed with the communication using LTE air-interface resources (such as a particular air-interface traffic channel, timeslots, or resource blocks). As another example, when the WCD 303 becomes engaged in an active wireless data session, the WCD 303 may continue to exchange packet data with the LTE network 301 over one or more channels until the data session is terminated or becomes inactive.

When the WCD 303 is operating in LTE coverage of network 301, it may place and receive calls on network CDMA network 200 by engaging in signaling (e.g., for voice calls, data sessions, etc.) through the LTE network 301. In particular, a WCD 303 that is engaged in a wireless data communication session with the LTE network 301 may be configured to switch, or "fall back," to CDMA when originating or receiving mobile terminated voice calls. This function, called "circuit-switched fallback" (CSFB), may enable voice services using circuit-switched CDMA network traffic channels, while using LTE network traffic channels for other functionality. Further, the IWF 316 may enable a service provider to implement CSFB functionality in accordance with the LTE network 301 and the CDMA network 200. Other network protocols or standards such as a Global System for Mobile Communications (GSM) standard can be used instead of CDMA.

In one example of CSFB functionality, a WCD 303 may engage in a wireless data communication session with an LTE network 301. While the WCD 303 is engaged in the active data session, the WCD 303 may then receive a page message from the LTE network 301 (e.g., from an eNB 304) that was transmitted by the CDMA network 200, and the page message may be representative of a voice call request for the WCD 303 to engage in a voice call with the CDMA network 200. If the WCD 303 accepts the request, the active data session may be interrupted in order to set up the voice call with the CDMA network 200. If the WCD 303 does not accept the request, the active data session may not be interrupted.

In the network arrangements shown in FIG. 2 and FIG. 3, as well as in other arrangements, a WCD may be configured to operate in either a DDTM OFF state or a DDTM ON state. When a WCD is configured to operate in the DDTM OFF state, the WCD may accept voice call setup requests and allow an active data session between a network and the WCD to be interrupted. Alternatively, when a WCD is configured to operate in the DDTM ON state, the WCD may reject voice call setup requests and prevent an active data session from being interrupted.

With respect to the arrangement shown in FIG. 2, for instance, the WCD 202 may be currently engaged in an active data session with the CDMA network 200 (e.g., a 1xEV-DO packet data session), and may receive a page message from the network 200 (e.g., from a BTS 204) representative of an incoming voice call setup request. If the WCD 202 is operating in the DDTM OFF state, the WCD 202 may accept the setup request, respond to the page message, and establish the voice call over the CDMA network 200. The data session may then become inactive and no further data may be exchanged with the CDMA network 200 until the call is terminated. If the WCD 202 is operating in the DDTM ON state, however, the WCD 202 may reject the setup request and not respond to the page message. The data session may then remain active.

Likewise, with respect to the arrangement shown in FIG. 3, the WCD 303 may be currently engaged in an active data session with the LTE network 301 (e.g., a VoIP call), and may receive a page message from the CDMA network 200 through the LTE network 301. The page message may be representative of an incoming voice call setup request. If the WCD 303 is operating in the DDTM OFF state, the WCD 303 may accept the setup request, switch from 4G/LTE to 3G/CDMA using CSFB, send a page response message to the CDMA network 200, and set up the voice call over a CDMA air-interface. If the WCD 303 is operating in the DDTM ON state, however, the WCD 303 may reject the setup request and not respond to the page message.

Further, in the network arrangements shown in FIG. 2 and FIG. 3, as well as in other arrangements, a WCD may be configured to set itself to operate in a particular DDTM state based on a type of data session that the WCD is engaged in with the network. The WCD may determine the type of data session and then set itself to operate in either the DDTM OFF state or the DDTM ON state. For example, a WCD may be engaged in a non-real-time data session with a CDMA network (or an LTE network), such as a web browsing session. The WCD may determine the type of data session and then set itself to operate in the DDTM OFF state in response to the data session being a non-real-time data session. While operating in the DDTM OFF state, the WCD may accept incoming voice calls and interrupt the non-real-time data session. In another example, the WCD may be engaged in a real-time data session, such as a VoIP call with an LTE network. The WCD may determine the type of data session and then set itself to operate in the DDTM ON state in response to the data session being a real-time data session. While operating in the DDTM ON state, the WCD may reject incoming voice calls so as to not interrupt the real-time data session. Other examples are also possible.

III. Example Wireless Communication Device

Figure 4:
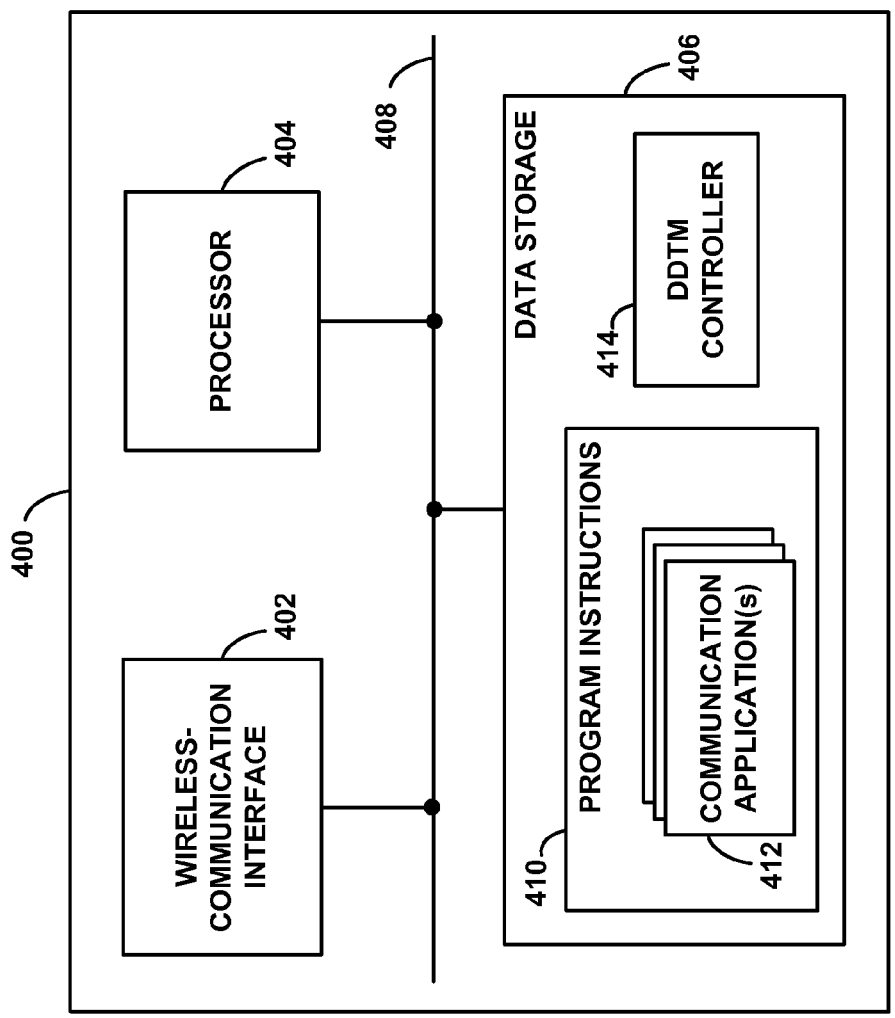
FIG. 4 is a simplified block diagram of an example wireless communication device (WCD) arranged to implement an example method.

FIG. 4 is a simplified block diagram of a representative WCD 400, such as a cell phone, smartphone, tablet, and the like. WCD 400 may be configured to operate with respect to one or more the example network arrangements described above, as well as other network arrangements not described herein. As such, WCD 400 may be representative of WCDs 108, 202, and/or 303 of FIGS. 1, 2, and 3, respectively.

As shown, WCD 400 may include a wireless-communication interface 402, a processor 404, and data storage 406, all of which may be coupled together by a system bus, network, or other connection mechanism 408. The WCD 400 may also include a user interface (not shown). The user interface may include buttons, a touchscreen, a microphone, and/or any other elements for receiving inputs, as well as a speaker, one or more displays, and/or any other elements for communicating outputs.

The wireless-communication interface 402 may comprise an antenna, radio, chipset, and/or other associated components to facilitate wireless and/or wired data communication with one or more entities, such as base stations, over an air-interface. As an example, the chipset could be one that is suitable for CDMA communication. As another example, the chipset could be one that is suitable for LTE communication. The chipset or wireless-communication interface 402 in general may also or instead be arranged to communicate according to one or more other types (e.g. protocols) mentioned herein and/or any others now known or later developed.

Processor 404 may comprise one or more general-purpose processors and/or one or more special-purpose processors, and may be integrated in whole or in part with wireless-communication interface 402. Data storage 406 may comprise one or more volatile and/or non-volatile storage components (such as magnetic, optical, flash, or other non-transitory storage) and may be integrated in whole or in part with processor 404. As shown, data storage 406 may hold program instructions 410 that are executable by processor 404 to carry out various functions.

The program instructions 410 may include one or more communication applications 412 executable by the processor 404. A particular communication application 412 may be configured to engage in a wireless data communication session of a given type (via the wireless-communication interface), and the given type of data session may vary depending on the particular communication application 412 that the data session is associated with. For example, a communication application 412 may be configured to engage in a real-time data session, such as a VoIP call. As another example, a communication application 412 may be configured to engage in a non-real-time data session, such as an Internet browsing session. A communication application 412 may also be configured to engage in other types of data sessions.

Execution of a communication application 412 may cause the WCD 400 to engage in the given type of data session. For example, an application 412 on the WCD 400 may be configured to make or receive VoIP calls over a 3G/CDMA air-interface, an LTE air-interface, or a Wi-Fi network, and executing the application 412 may cause the WCD 400 to engage in the VoIP data session.

When a communication application 412 on the WCD 400 is initiated/executed, the communication application 412 may output a notification indicative of the given type of wireless data communication session. For example, the WCD 400 may include a communication application 412 configured to engage in only one type of data session and output a notification indicative of that type of data session. As another example, the WCD 400 may include a communication application 412 configured to engage in both real-time and non-real-time data sessions may output a notification indicative of the given type of data session that the WCD is engaged in at a given moment and/or for a given duration of time. After the notification is outputted by the communication application 412, the notification may be received by a DDTM controller 414 configured to receive the indication when the communication application 412 initiates a given type of data session and set the WCD to operate in a DDTM OFF or DDTM ON state based on the given type of data session.

Additionally or alternatively, when the communication application 412 is initiated/executed, the communication application 412 may store a flag indicative of the given type of data session in data storage 406. The DDTM controller 414 may then refer to the stored flag and set itself to operate in the DDTM OFF or DDTM ON state based on the given type of data session. The DDTM controller 414 may be configured to perform other functions as well.

IV. Example Operations

Figure 5:
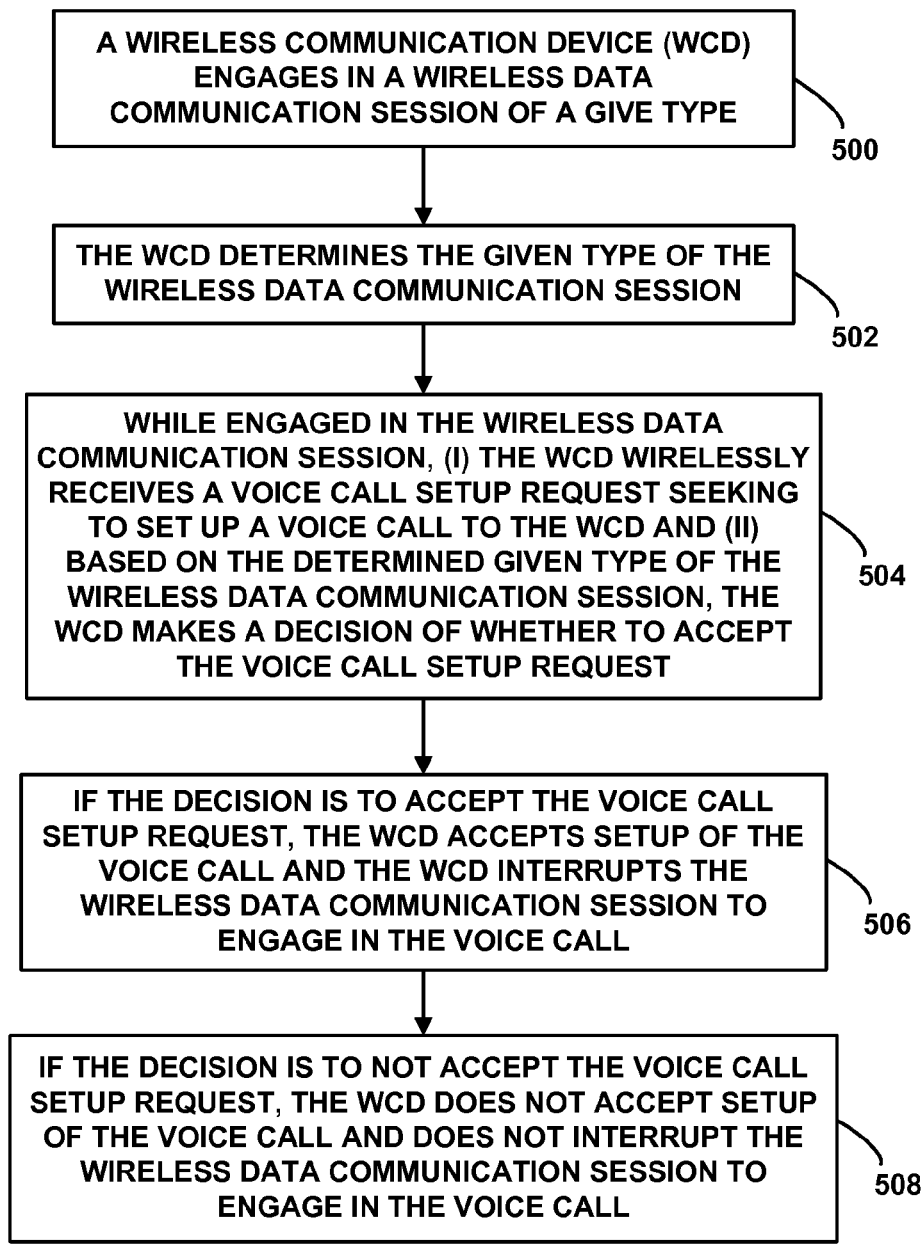
FIG. 5 is a flow chart depicting functions that can be carried out in accordance with an example method.
Figure 6:
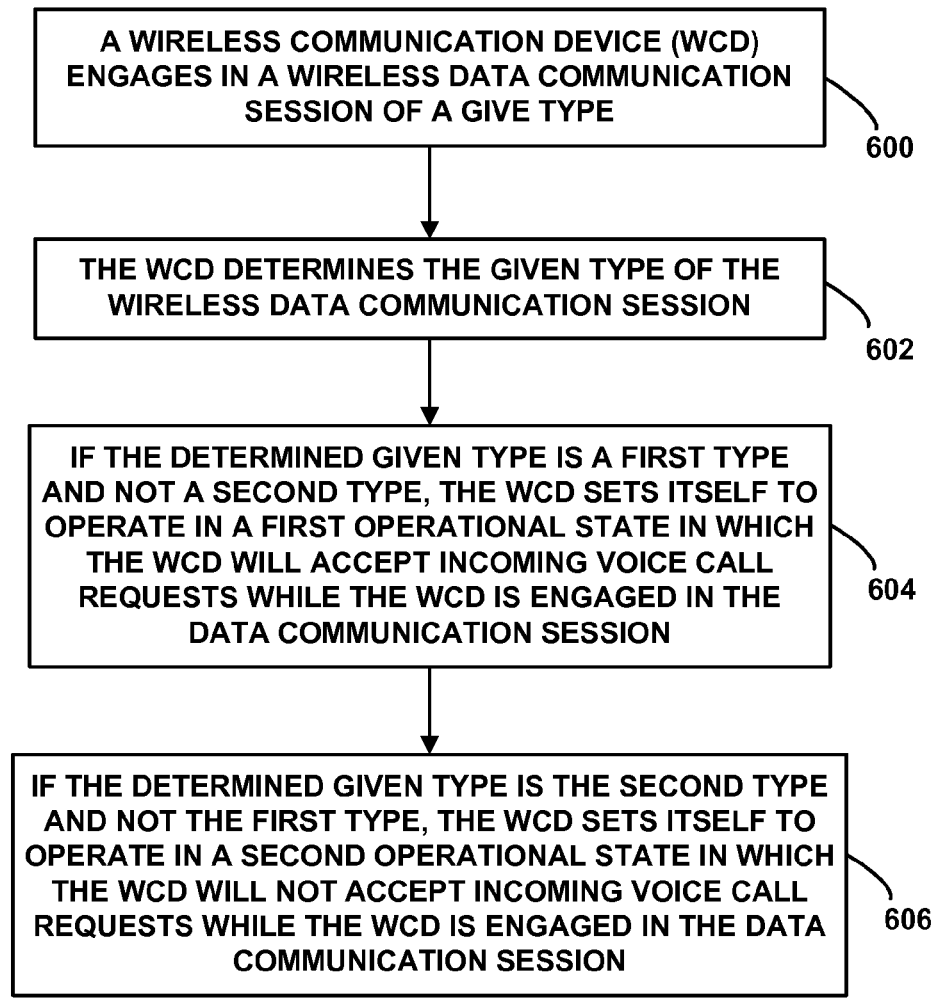
FIG. 6 is a flow chart depicting functions that can be carried out in accordance with an example method.

FIG. 5 and FIG. 6 are flow charts illustrating in summary some of the functions that can be carried out by a given WCD in accordance with the present method. For the sake of example, the given WCD will be assumed to operate with respect to the network arrangement described in FIG. 3. It should be understood, however, that in other examples, the given WCD may be configured to operate with respect to other network arrangements, such as 3G networks, 4G networks, and combinations thereof.

The present method may include one or more operations, functions, or actions as illustrated by one or more of blocks 500-508 and 600-606. Although the blocks are illustrated in a sequential order, the functions illustrated by the blocks may also be performed in parallel, and/or in another order different than those described herein.

Referring to FIG. 5, at block 500, the WCD engages in a wireless data communication session of a given type. The WCD may include a wireless-communication interface 402, such as a radio (e.g., a single-radio WCD), configured to operate in accordance with an air-interface protocol, such as CDMA or LTE, and engage in the wireless data communication session of the given type over the air-interface. For example, while operating in LTE coverage of network 301, the WCD may engage in a VoIP call over an LTE air-interface (e.g., a VoLTE call). In another example, while operating in CDMA coverage of network 200, the WCD may engage in a PTT session over a CDMA air-interface.

In order to engage in the wireless data communication session over the air-interface, the wireless-communication interface 402 may send a message to a network so as to request initiation of the data session. The network may then assign one or more traffic channels to the WCD. When the WCD becomes engaged in the data session, the WCD may continue to exchange packet data with the network over one or more channels until the data session is terminated or becomes inactive.

At block 502, the WCD determines the given type of the wireless data communication session. The WCD may determine the given type of data session when the data session is initiated. Alternatively, the WCD may determine the given type of data session after the data session is initiated at a point during which the WCD is engaged in the data session. In order to determine the given type of data session, the WCD may store an indication (e.g., a flag) of the given type of data session, such as a notification outputted by a communication application 412, when the data session is initiated/executed. Other WCD components, such as a DDTM controller 414, may be configured to receive the indication and perform one or more functions based on the given type of data session. A given type of wireless data communication session may include a real-time data session, such as a VoIP call, and a non-real-time data session, such as an Internet browsing session. Other types of data sessions are also possible.

At block 504, while engaged in the wireless data communication session, the WCD wirelessly receives a voice call setup request seeking to set up a voice call (e.g., a mobile-terminated call) to the WCD, and the WCD makes a decision of whether to accept the voice call setup request based on the determined given type of the wireless data communication session.

The WCD may receive the voice call setup request in various ways. For example, the wireless-communication interface 402 may receive the voice call setup request from a CDMA network 200, or other 3G network. In another example, the wireless-communication interface 402 may receive the voice call setup request through a 4G network, such as an LTE network 301, from the 3G network. Further, the voice call setup request may take the form of a CSFB page message received over an LTE air-interface indicative of a request to establish a circuit-switched voice call with the WCD over a CDMA air-interface.

In order to make the decision of whether to accept the voice call setup request, the WCD may refer to a stored indication of the given type of data session, such as a flag. The WCD may then accept or reject the voice call setup request upon referring to the stored flag. For example, the WCD may accept the voice call setup request when the stored flag indicates that the given type of data session that the WCD is currently engaged in is a non-real-time data session. In another example, the WCD may reject the voice call setup request when the stored flag indicates that the given type of data session that the WCD is currently engaged in is a real-time data session.

At block 506, if the decision is to accept the voice call setup request, the WCD accepts setup of the voice call and the WCD interrupts the wireless data communication session to engage in the voice call. For example, the WCD may receive a voice call setup request from a CDMA network 200 while the WCD is engaged in an active web browsing session with a LTE network 301, and the WCD may determine to accept the setup request based on the type of data session and proceed to establish the voice call with the CDMA network 200 by switching from LTE to CDMA and sending a page response message to the CDMA network 200. As a result, the web browsing session that the WCD was engaged in prior to establishing the voice call may become inactive for the duration of the voice call.

At block 508, if the decision is to not accept the voice call setup request, the WCD does not accept setup of the voice call and the WCD does not interrupt the wireless data communication session to engage in the voice call. For example, the WCD may receive a voice call setup request from the CDMA network 200 while the WCD is engaged in an active VoIP call with the LTE network 301, and the WCD may determine to not accept (e.g., reject) the setup request based on the type of data session by not sending a page response message to the CDMA network 200. As a result, the active VoIP call that the WCD is engaged in when the WCD receives the setup request may remain active and not be interrupted.

Referring now to FIG. 6, blocks 600 and 602 illustrate the same functions as illustrated by blocks 500 and 502 of FIG. 5. As such, for the sake of example, it can be assumed that the descriptions of the functions illustrated by blocks 600 and 602 are the same as those of the functions illustrated by blocks 500 and 502. It should be understood, however, that in other examples not described herein, the descriptions of the functions illustrated by blocks 600 and 602 may differ from those of blocks 500 and 502.

At block 604, the WCD sets itself to operate in a first operational state if the determined given type of data session is a first type and not a second type. The WCD may have two different operational states (which also may be referred to as operational "modes"): the first operational state, in which the WCD may be configured to accept incoming voice call requests while engaged in a wireless data communication session (e.g., DDTM OFF), and a second operational state in which the WCD may be configured to reject incoming voice call requests while engaged in a wireless data communication session (e.g., DDTM ON). The WCD may set itself to operate in one of the two operational states based on whether the determined given type of data session is the first type of data session or the second type of data session. For the sake of example, two data sessions are described herein: a non-real-time data session (the first type) and a real-time data session (the second type). However, other types of data sessions are also possible.

Further, as described above, the WCD may include a DDTM controller 414 configured to receive, from a communication application 412, an indication of the given type of data session. In response to receiving the indication, the DDTM controller 414 may then set the WCD to operate in the first or second operational state based on the given type of data session.

When the WCD is engaged in a non-real-time data session and not a real-time data session, the WCD may set itself to operate in the DDTM OFF state. While operating in the DDTM OFF state, the WCD may accept incoming voice calls (e.g., a voice call setup request page message sent by a network) while the WCD is engaged in the non-real-time data session. In order to accept an incoming voice call, the WCD may respond to the voice call setup request page message by sending a page response to the network so as to establish the voice call with the network.

The WCD may be engaged in a web browsing session with the LTE network 301, for example. Because the web browsing session is a non-real-time data session and not a real-time data session, the WCD may set itself to operate in the DDTM OFF state, in which it may accept an incoming voice call from the CDMA network 200 and interrupt the web browsing session. By accepting the voice call, the web browsing session may become inactive and the WCD may establish the voice call over a CDMA air-interface with the CDMA network 200.

At block 606, the WCD sets itself to operate in the second operational state if the determined given type of data session is the second type and not the first type. In response to determining that the given type of data session is a real-time data session and not a non-real-time data session, the DDTM controller 414 of the WCD may set the WCD to operate in the DDTM ON state, in which the WCD may not accept incoming voice call requests while the WCD is engaged in the real-time data session. Further, the WCD may notify the network (e.g., the 3G network and/or the 4G network) that it has rejected the voice call request.

As an example, the WCD may execute a communication application 412 configured to establish a real-time data session, such as a VoIP call over an LTE air-interface protocol. The WCD may remain engaged in the VoIP call until termination of the communication application 412. Upon initiation of the VoIP call, the communication application 412 may store a flag indicative of the given type of data session, and the DDTM controller 414 of the WCD may then refer to the stored flag and set itself to operate in the DDTM ON state based on the given type of data session. While engaged in the VoIP call and operating in the DDTM ON state, the WCD may receive a page message over CDMA or LTE indicative of a request to establish a 1 xRTT call over a CDMA interface. Because the WCD is operating in the DDTM ON state, the WCD may reject the request so as to not interrupt the VoIP call, and may respond to the request with a page response sent to the CDMA network 200 that is indicative of the rejection of the request.

Additional aspects of the described method can be implemented as well. In one aspect, while engaged in a real-time data session, a WCD may operate in a DDTM ON state for a period of time until the WCD is no longer engaged in the real-time data session. After termination of the real-time data session, the WCD may remain in the DDTM ON state until another wireless data communication session is established. Alternatively, the WCD may be configured to switch to the DDTM OFF state as a default state of operation.

In another aspect, upon termination of a real-time data session during which the WCD is configured to reject all incoming voice call requests, the WCD may initiate a non-real-time data session, and thus the WCD may set itself to operate in the DDTM OFF state in which the WCD may allow incoming voice calls to be established with a network, thereby interrupting the non-real-time data session.

In yet another aspect, a WCD may be configured to accept an incoming voice call setup request if the voice call setup request is representative of an emergency voice call. The WCD may receive an incoming voice call setup request of a given type (e.g., indicated by a page message) from a network, determine the given type, and accept the voice call setup request based on the determined given type (e.g., if the voice call setup request is an emergency voice call setup request). Further, the WCD may accept emergency voice call setup requests regardless of whether the WCD is operating in the DDTM ON state. Both a real-time and a non-real-time data session can be interrupted when a WCD receives and accepts an incoming emergency voice call setup request so as to establish an emergency voice call over an air-interface with the network.

In still another aspect, a WCD may be connected to at least one computing device (e.g., tethering), such as another WCD, a laptop computer, tablet computer, and the like, so as to share an Internet connection and/or exchange data in a data communication session. Further, the WCD may be connected to the at least one computing device via a wired and/or wireless connection, such as over a Wi-Fi network and/or a USB connection. While connected to the at least one computing device, the WCD may establish a data communication session of a given type with a network (e.g., real-time, non-real-time, or other), and set itself to operate in an operational state based on a determining of the given type of data session. In particular, the WCD may set itself to operate in a DDTM ON state while engaged in data communication with the at least one computing device so that the data session will not be interrupted by an incoming voice call.

While various aspects have been disclosed herein, other aspects will be apparent to those skilled in the art. The various aspects disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method comprising:
   a wireless communication device (WCD) engaging in a wireless data communication session of a given type;
   the WCD determining the given type of the wireless data communication session;
   while engaged in the wireless data communication session, (i) the WCD wirelessly receiving an incoming voice call setup request seeking to set up a voice call to the WCD and (ii) based on the determined given type of the wireless data communication session and based on whether the incoming voice call setup request is an emergency incoming voice call setup request, the WCD making a decision of whether to accept the incoming voice call setup request, wherein, when the determined given type of the wireless data communication session is a first type rather than a second type, the WCD operates with a data dedicated transmission mode (DDTM) turned on, and wherein, with the DDTM turned on, the WCD decides to not accept the incoming voice call setup request unless the incoming voice call setup request is an emergency incoming voice call setup request;
   if the decision is to accept the incoming voice call setup request, the WCD accepting setup of the voice call and the WCD interrupting the wireless data communication session to engage in the voice call; and
   if the decision is to not accept the incoming voice call setup request, the WCD not accepting setup of the voice call and not interrupting the wireless data communication session to engage in the voice call.

2. The method of claim 1, further comprising the WCD initiating the wireless data communication session, wherein the determining occurs when the WCD initiates the wireless data communication session.

3. The method of claim 2, further comprising the WCD storing an indication of the determined given type, wherein making the decision based on the determined given type comprises referring to the stored indication and making the decision based on the stored indication.

4. The method of claim 1, wherein the WCD has a first operational mode in which the WCD operates with DDTM turned off and accepts incoming voice call requests while engaged in wireless data communication, and wherein the WCD has a second operational mode in which the WCD operates with DDTM turned on and does not accept incoming voice call requests while engaged in wireless data communication unless the incoming voice call setup request is an emergency incoming voice call setup request, the method further comprising:
   based on the determined given type, the WCD setting itself to operate in a current operational mode selected from the group consisting of the first operational mode and the second operational mode,
   wherein making the decision based on the determined given type comprises making the decision in accordance with the current operational mode.

5. The method of claim 4, wherein the WCD setting itself to operate in the current operational mode comprises the WCD storing a flag indicating the current operational mode, and wherein making the decision in accordance with the current operational mode comprises referring to the flag and, based on the flag, deciding whether to accept the incoming voice call setup request.

6. The method of claim 1,
   wherein the given type of the wireless data communication session is selected from the group consisting of the first type and the second type,
   wherein the first type is real-time and the second type is non-real-time, and
   wherein making the decision of whether to accept the incoming voice call setup request based on the determined given type of the wireless data communication session comprises (i) deciding to not accept the incoming voice call setup request if the given type is real-time, unless the incoming voice call setup request is an emergency incoming voice call setup request, and (ii) deciding to accept the incoming voice call setup request if the given type is non-real-time.

7. The method of claim 1, wherein if the given type comprises Voice over Internet Protocol (VoIP), the decision is to not accept the incoming voice call setup request unless the incoming voice call setup request is an emergency incoming voice call setup request.

8. The method of claim 1, wherein the WCD includes a radio operating in accordance with an air-interface protocol, wherein the WCD engaging in the wireless data communication session comprises the WCD using the radio to engage in the wireless data communication session on the air-interface protocol, and wherein the WCD receiving the incoming voice call setup request comprises the radio receiving the incoming voice call setup request on the air-interface protocol.

9. The method of claim 8, wherein the air-interface protocol is Long Term Evolution (LTE), and wherein receiving the incoming voice call setup request on the air-interface protocol comprises receiving a circuit-switched-fallback page over LTE.

10. The method of claim 4, further comprising:
    while operating in the second operational mode, the WCD wirelessly receiving a page message indicating a type of the incoming voice call setup request; and
    the WCD determining, based on the page message, that the type of incoming voice call setup request is an emergency incoming voice call setup request, wherein making the decision based on the determined given type of the wireless data communication session and based on whether the incoming voice call setup request is an emergency incoming voice call setup request comprises making a decision to accept the emergency incoming voice call setup request.

11. A non-transitory computer-readable medium having stored thereon program instructions executable by a wireless communication device (WCD) to cause the WCD to perform functions comprising:
    engaging in a wireless data communication session of a given type;
    determining the given type of the wireless data communication session;
    while engaged in the wireless data communication session, (i) detecting receipt by the WCD of an incoming voice call setup request that seeks setup of a voice call to the WCD and (ii) based on the determined given type of the wireless data communication session and based on whether the incoming voice call setup request is an emergency incoming voice call setup request, making a decision of whether to accept the incoming voice call setup request, wherein, when the determined given type of the wireless data communication session is a first type rather than a second type, the WCD operates with a data dedicated transmission mode (DDTM) turned on, and wherein, with the DDTM turned on, the WCD decides to not accept the incoming voice call setup request unless the incoming voice call setup request is an emergency incoming voice call setup request;

if the decision is to accept the incoming voice call setup request, accepting setup of the voice call and interrupting the wireless data communication session to engage in the voice call; and if the decision is to not accept the incoming voice call setup request, not accepting setup of the voice call and not interrupting the wireless data communication session to engage in the voice call.

12. The non-transitory computer-readable medium of claim 11, wherein the incoming voice call setup request is a request from a radio access network (RAN) to establish a circuit-switched voice call with the WCD over a Code Division Multiple Access (CDMA) air-interface protocol.

13. The non-transitory computer-readable medium of claim 11, wherein the WCD has a first operational mode in which the WCD accepts incoming voice call requests while engaged in wireless data communication and a second operational mode in which the WCD does not accept incoming voice call requests while engaged in wireless data communication unless the incoming voice call setup request is the emergency incoming voice call setup request, the functions further comprising:

based on the determined given type, setting the WCD to operate in a current operational mode selected from the group consisting of the first operational mode and the second operational mode, wherein making the decision based on the determined given type comprises making the decision in accordance with the current operational mode.

14. The non-transitory computer-readable medium of claim 11, wherein making the decision of whether to accept the incoming voice call setup request based on the determined given type of the wireless data communication session and based on whether the incoming voice call setup request is an emergency incoming voice call setup request comprises:

based on the determined given type of the wireless data communication session, making a decision to not accept the incoming voice call setup request unless the incoming voice call setup request is the emergency incoming voice call setup request.

15. A wireless communication device (WCD) comprising:
at least one wireless communication interface;
at least one processor;
data storage; and
program instructions stored in the data storage, wherein the program instructions are executable by the at least one processor to perform functions when the WCD engages in a wireless data communication session of a given type, the functions comprising:

determining the given type of the wireless data communication session, if the determined given type is a first type and not a second type, the WCD setting itself to operate in a first operational state in which the WCD will accept incoming voice call requests while the WCD is engaged in the data communication session, and if the determined given type is the second type and not the first type, the WCD setting itself to operate in a second operational state in which the WCD will not accept incoming voice call requests while the WCD is engaged in the data communication session unless the incoming voice call request is an emergency incoming voice call request, wherein data dedicated transmission mode (DDTM) is turned on when the WCD operates in the second operational state.

16. The WCD of claim 15, having program instructions stored in the data storage, wherein the program instructions are executable by the at least one processor for performing functions further comprising:

while engaged in the first type of wireless data communication session and operating in the first operational state, receiving an incoming voice call request via a radio access network (RAN), and accepting the incoming voice call request so as to establish a voice call with the RAN and interrupt the wireless data communication session in order to engage in the voice call with the RAN;

while engaged in the second type of wireless data communication session and operating in the second operational state, receiving an incoming voice call request via a RAN, and not accepting the incoming voice call request so as to not interrupt the wireless data communication session in order to engage in the voice call with the RAN; and while engaged in the second type of wireless data communication session and operating in the second operational state, receiving an incoming voice call request via a RAN, and, based on a determination that the incoming voice call request is an emergency incoming voice call request, accepting the emergency incoming voice call request so as to interrupt the wireless data communication session in order to engage in an emergency voice call with the RAN.

17. The WCD of claim 15, further comprising:
wherein the WCD engages in the wireless data communication session over a Long-Term Evolution (LTE) air-interface, and
wherein incoming voice call requests are requests for the WCD to engage in a voice call over a Code Division Multiple Access (CDMA) air-interface.

18. The WCD of claim 15, further comprising a communication application stored in the data storage and executable by the at least one processor to cause the WCD to engage in the wireless data communication session of the given type, wherein the functions further comprise determining the given type from the communication application.

19. The WCD of claim 18, wherein determining the given type from the communication application comprises the communication application outputting a notification of the given type, wherein the determining of the given type is based on the notification.

* * * * *